United States Patent

Shahid

[11] Patent Number: 5,984,530
[45] Date of Patent: Nov. 16, 1999

[54] OPTICAL FIBER CONNECTOR AND METHOD FOR MAKING SAME

[75] Inventor: Muhammed A. Shahid, Snellville, Ga.

[73] Assignee: Lucent Technologies, Inc., Murray Hill, N.J.

[21] Appl. No.: 08/936,648

[22] Filed: Sep. 24, 1997

[51] Int. Cl.⁶ .................................................... G02B 6/38
[52] U.S. Cl. ................................ 385/55; 385/60; 385/59; 385/63
[58] Field of Search ................................ 385/55, 53, 54, 385/56, 59, 62, 63, 65

[56] References Cited

U.S. PATENT DOCUMENTS

| 5,815,621 | 9/1998 | Sakai et al. | 385/60 |
| 5,845,026 | 12/1998 | Lee et al. | 385/58 |

FOREIGN PATENT DOCUMENTS

| 2315705 | 1/1997 | France. |
| 54-160248 | 12/1979 | Japan. |
| 59-088712 | 5/1984 | Japan. |
| 62-172309 | 7/1987 | Japan ........................................ 385/65 |

OTHER PUBLICATIONS

"Us Conec Spreads MT Connector into North American Markets"—Toshiaki Satake NTT Review vol. 5, No. 4, Jul. 1, 1993 pp.82–89.

*Primary Examiner*—Rodney Bovernick
*Assistant Examiner*—Ellen E. Kang

[57] ABSTRACT

An improved optical fiber connector design and associated manufacturing method which provides increased manufacturing throughput by molding connector bodies as a unitary molded part as joined back-to-back pairs of connector bodies.

8 Claims, 3 Drawing Sheets

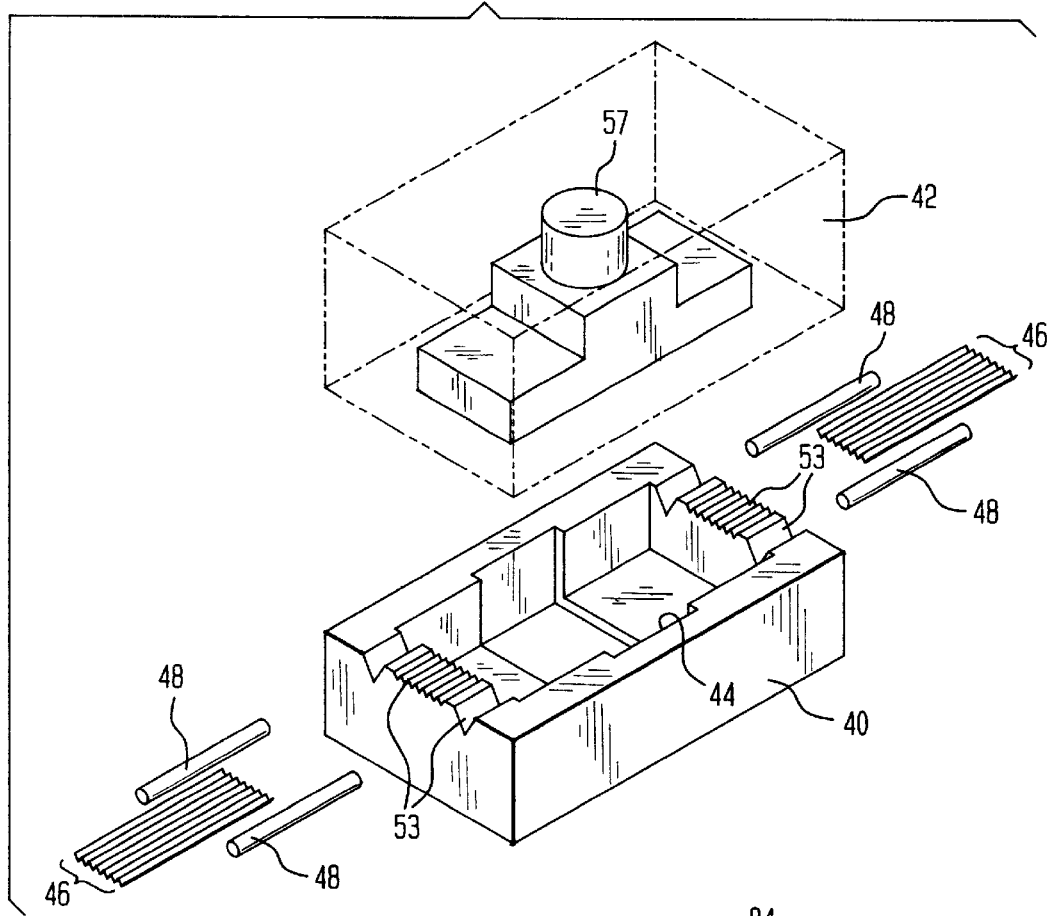
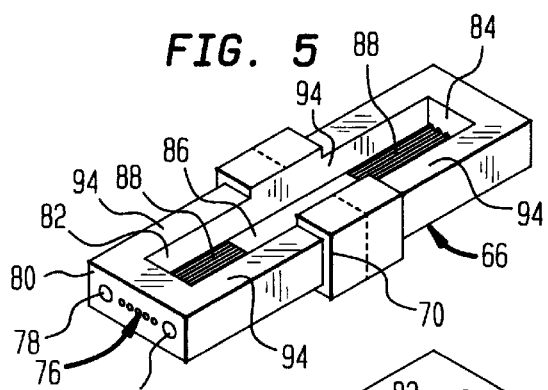
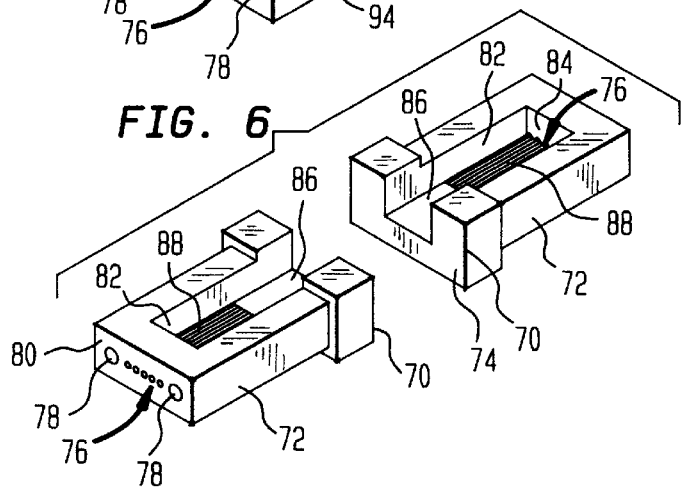

OPTICAL FIBER CONNECTOR AND METHOD FOR MAKING SAME

BACKGROUND OF THE INVENTION

This invention relates to optical fiber connectors and, more particularly, to an improved connector design and associated manufacturing method which provides increased manufacturing throughput.

Connectors for optical fibers must be manufactured in accordance with certain standards so that when a pair of connectors are mated the optical fibers contained in each connector are properly aligned for light transfer with the fibers in the other connector of the mated pair. One such type of connector is known as an MT (Mechanical Transfer) connector which is made in various sizes for up to twelve fibers in a linear array. This type of connector includes a substantially rectilinear body having a front mating face and a parallel rear face. The fibers enter the connector through the rear face as part of a fiber ribbon cable. The holes by means of which the individual fibers are exposed at the front mating face are formed with very precise tolerances and the front mating face, along with the ends of the fibers exposed thereat, is polished.

The MT connector bodies are typically manufactured by a transfer molding process in which the holes are formed by molding around precisely sized and positioned pins. After molding and curing, the pins are withdrawn to leave the precise holes for the fibers. The MT connector body is also formed with a cavity extending into the body from its upper surface and intersecting the precision holes. A further relatively large opening is formed through the rear face which also intersects the cavity. The ribbon cable is inserted through the opening in the rear face, and the forward ends of the fibers are stripped from the ribbon and are manipulated within the cavity into the precision holes, from which they extend outwardly beyond the front mating face. The fibers are then set in place by epoxy or other suitable adhesive, and the front mating face of the body, along with the fibers exposed thereat, is polished.

Because of the design of the connector block, until now molding has been accomplished on a one connector per cavity basis. It would be desirable to effect a change of design of the connector body so that the molding throughput can be increased.

SUMMARY OF THE INVENTION

According to the present invention, optical fiber connector molding throughput is increased by providing an improved method for making optical fiber connectors. Each of the connectors has a body with a rear face into which at least one optical fiber is received and a front mating face at which an end of the optical fiber is exposed for light transfer with a corresponding optical fiber of a mating connector. The improved method comprises the steps of providing a mold having a mold cavity configured for forming as a unitary molded part a pair of connector bodies joined at their rear faces, using the mold to produce the unitary molded part, and cutting the unitary molded part along a plane orthogonal to the length of the unitary molded part to separate the pair of connector bodies one from the other, the planar cut forming the rear face of each of the pair of connector bodies.

In accordance with an aspect of this invention, the step of providing a mold includes the steps of providing at least two core pins, and inserting the core pins into the mold cavity orthogonal to the plane to subsequently provide at least one opening in each of the pair of connector bodies for receiving an optical fiber therein. Each of the openings extends into its respective connector body from its front mating face.

In accordance with another aspect of this invention, prior to the step of cutting the core pins are removed from the unitary molded part.

According to the present invention, there is provided an optical fiber connector having a rear face into which at least one optical fiber is received and a substantially parallel front mating face at which an end of the optical fiber is exposed for light transfer with a corresponding optical fiber of a mating connector. The inventive connector is adapted to be molded as one of a pair of connectors joined at their rear faces and comprises a substantially rectilinear solid body terminated at opposed ends by the rear face and the front mating face and having an upper surface extending between the opposed ends. A cavity extends into the body from the upper surface and the rear face, the cavity being bounded by a front wall parallel to the front mating face. At least one straight fiber receiving bore extends through the body from the front mating face to the cavity front wall and is orthogonal to the front mating face. Accordingly, an optical fiber can be installed from the rear face into the cavity and then be manipulated into a fiber receiving bore.

In accordance with another aspect of this invention, the cavity has a substantially planar lower wall which is orthogonal to the front wall, and the bore intersects the front wall at the juncture of the front wall and the lower wall.

In accordance with yet another aspect of this invention, the lower wall is formed with at least one groove aligned with the at least one bore.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 3 schematically depicts a mold for manufacturing optical fiber connector bodies according to the present invention;

FIG. 5 illustrates a unitary molded part constructed according to this invention; and FIG. 6 illustrates a pair of connector bodies formed from the unitary molded part shown in FIG. 5.

DETAILED DESCRIPTION

Figure 1:
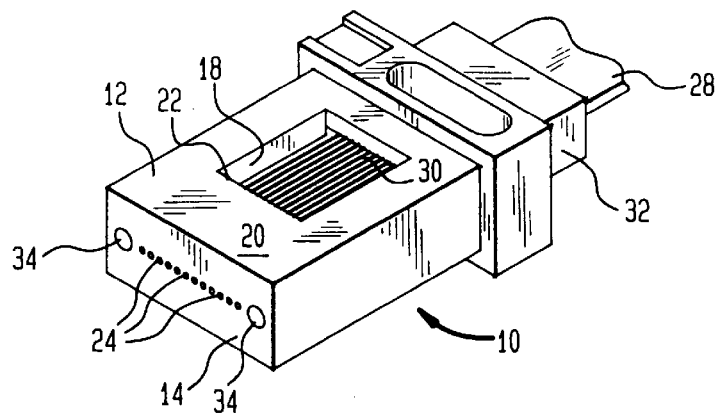
FIG. 1 is a perspective view illustrating a prior art MT optical fiber connector.
Figure 2:
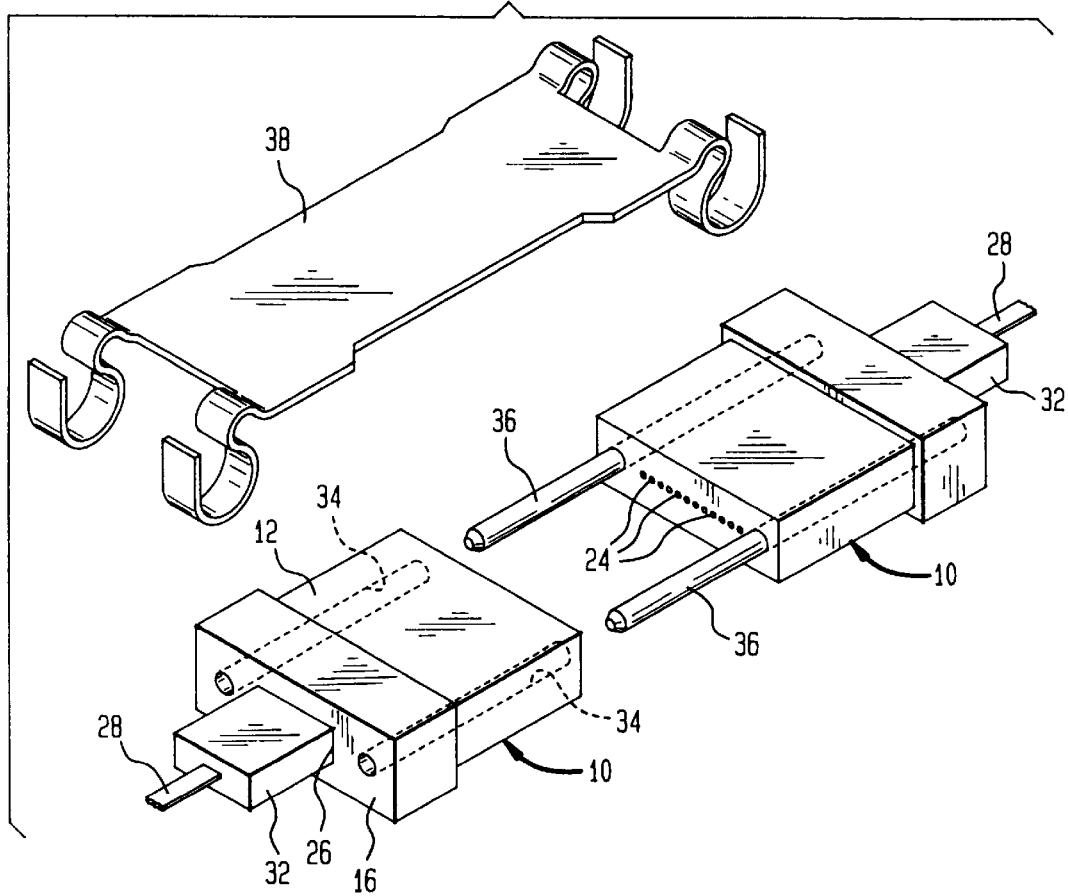
FIG. 2 illustrates the mating of a pair of optical fiber connectors of the type shown in FIG. 1.

Referring now to the drawings, FIGS. 1 and 2 illustrate prior art MT optical fiber connectors. As shown in FIG. 1, each connector 10 includes a substantially rectilinear body 12 having a front mating face 14 and a parallel rear face 16 (FIG. 2). A substantially rectilinear cavity 18 extends into the body 12 from its upper surface 20. The cavity 18 is bounded by a front wall 22 parallel to the front mating face 14. A linear array of precision holes 24 extend through the body 12 from the front mating face 14 to the front wall 22 of the cavity 18, the holes 24 being straight and orthogonal to the front mating face 14. A relatively large opening 26 is formed in the body 12 and extends from the rear face 16 to the cavity 18.

The optical fibers to be installed in the connector 10 are contained within a ribbon cable 28 which is inserted through the opening 26 in the rear face 16 and into the cavity 18. The forward ends of the fibers are stripped and separated from the ribbon cable 28 and then are manipulated within the cavity 18 into the holes 24 and are moved forwardly until they extend outwardly beyond the front mating face 14. To assist in the manipulation of the fibers into the holes 24, the bottom of the cavity 18 is formed to be substantially planar with a plurality of linear grooves 30 which are aligned with the holes 24. Epoxy, or other suitable adhesive, is used to fill the cavity 18 and any spaces within the holes 24, as well as the opening 26, to set the fibers in place. In addition, epoxy can be used to bond a strain relief 32 where the ribbon cable 28 exits the body 12 at the rear face 16. After the epoxy has been set, the front mating face 14 along with the outwardly extending fibers, is polished to insure a smooth mating surface for the efficient transmission of light between corresponding fibers of mating connectors.

In addition to the holes 24, the body 12 is formed with a pair of guide holes 34 flanking the linear array of fiber receiving precision holes 24. As shown in FIG. 2, one of the two mating connectors has a pair of guide pins 36 set into respective ones of its pair of guide holes 34 and held in place by suitable means. Therefore, when the pair of connectors 10 are to be mated, the guide pins 36 installed in one of the connectors are inserted into the guide holes 34 of the other connector body, thereby precisely aligning corresponding fibers exposed in the holes 24 at the front mating faces 14 of the two connectors. A clip 38 may then be utilized to maintain close contact between the front mating faces 14 of the pair of mating connectors 10, the clip 38 bearing against the rear faces 16 of each of the bodies 12 of the pair of connectors 10.

As previously discussed, heretofore one connector body 12 has been molded per cavity. In accordance with the present invention, the connector body design has been modified to enable molding of two connector bodies per cavity, thereby substantially doubling the manufacturing throughput. The present invention takes advantage of the fact that only the front end of each connector body must be very precisely manufactured. Accordingly, pairs of connector bodies are molded back-to-back as a unitary molding part and then are separated along a plane which defines the rear faces of the two connector bodies. In the following discussion, the present invention will be described as if the two connector bodies of the pair of connector bodies molded together are identical. However, the present invention contemplates that pairs of nonidentical connector bodies can be molded together backto-back and then cut along a plane defining their respective rear faces.

FIG. 3 schematically depicts mold apparatus for use in practicing the present invention. As shown, a two part mold 40, 42 is provided. The mold 40, 42 has a mold cavity 44 configured to form as a unitary molded part a pair of the inventive connector bodies joined at their rear faces. To form the holes in the front mating faces of the connector bodies, a plurality of core pins are provided. The core pins are of two types. The core pins 46 are used for forming the precision fiber receiving holes 24 and the core pins 48 are used for forming the guide holes 34. The use of such core pins 46, 48 in a transfer molding process is well known in the art and no further description is deemed necessary.

Figure 4:
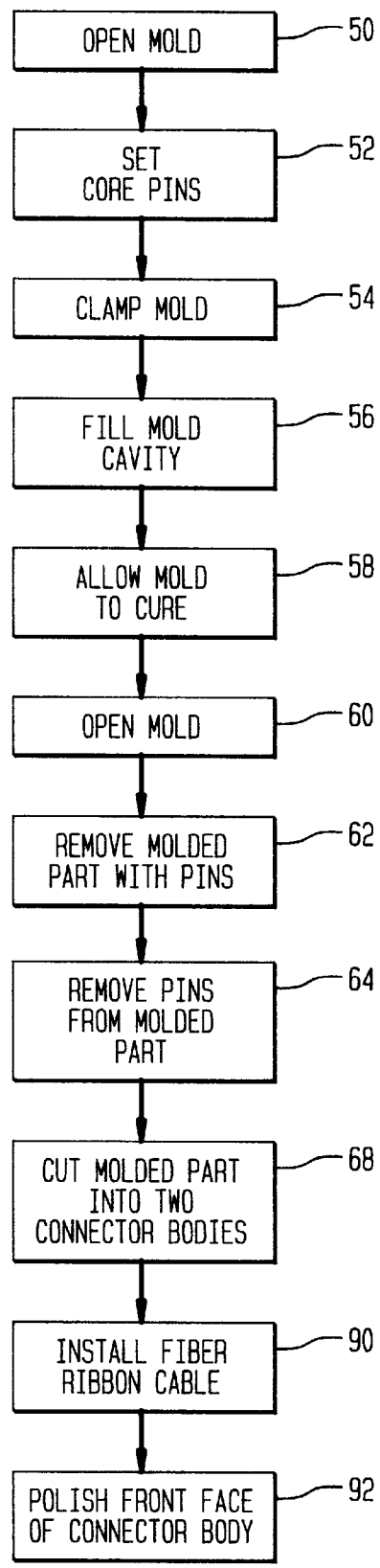
FIG. 4 is a flow chart showing the manufacturing process according to the present invention.

FIG. 4 shows the steps utilized for manufacturing connector bodies according to the present invention. Thus, in the step 50, the mold is opened by separating the two mold parts 40, 42. In the step 52, the core pins 46, 48 are set into respective V-grooves 53 provided in the mold parts 40, 42. In the step 54, the mold parts 40, 42 are clamped together. In the step 56, the mold cavity 44 is filled with plastic material through the transfer port 57. In the step 58, the mold is allowed to cure.

In the step 60, the mold is opened by separating the mold parts 40, 42. In the step 62, the unitary molded part, along with the core pins 46, 48, is removed from the mold cavity 44. In the step 64, the core pins 46, 48 on each side of the molded part are pulled in opposite directions to remove them from the molded part. The resultant molded part 66 is shown in FIG. 5. In the step 68, the molded part 66 is cut along a plane shown by the broken line 70 which is substantially parallel to the faces at either end of the molded part 66. As shown in FIG. 6, this results in two connector bodies 72, wherein the cut made in the step 68 forms the rear face 74 of each of the connector bodies 72. Thus, in substantially the same amount of time required to mold a single connector body in accordance with the prior art, two connector bodies are formed in accordance with the present invention, thereby substantially doubling the manufacturing throughput.

As shown in FIG. 5, the unitary molded part 66 is a pair of back-to-back connector bodies joined at their rear faces. At each end of the part 66 there is exposed a linear array of fiber receiving holes 76 formed by the core pins 46 and flanked by a pair of exposed guide holes 78 formed by the core pins 48. The holes 76, 78 are exposed at what will become the front mating face 80 of each connector body. The part 66 is further formed with a cavity 82, preferably shaped substantially rectilinearly, which extends across the plane 70. The cavity 82 is bounded at either end by a front wall 84 which is parallel to the front mating face 80. The fiber receiving holes 76 are also exposed at the front wall 84. The cavity 82 further has a substantially planar lower wall 86 orthogonal to the front wall 84 and which is formed over at least a portion extending from the front wall 84 with a plurality of grooves 88. The dimensions of the molded part 66 are such that each of the grooves 88 is aligned with a respective one of the fiber receiving holes 76 where it is exposed at the front wall 84. The cavity 82 has to extend all the way to the rear face 74 since when molding a pair of connector bodies back-to-back it would otherwise be impossible to provide an opening from the rear face 74 to the cavity, as is the case with the opening 26 in the prior art connector body.

In the step 90, a fiber ribbon cable is installed in the connector body 72. Initially, the forward ends of the fibers are stripped and separated from the ribbon cable and laid on the lower wall 86 of the cavity 82. Each of the individual fibers is then manipulated into a respective one of the grooves 88 and pushed forward into a respective one of the fiber receiving holes 76. The grooves 88 assist in the insertion of the fibers into the holes 76. The fibers are then pushed forwardly until they extend out beyond the front mating face 80 of the connector body 72. Epoxy or other suitable adhesive is applied to fill the cavity 82 and set the fibers in place. In the step 92, the front mating face 80 of the connector body 72, along with the outwardly extending fibers, is polished to insure a smooth mating surface for the efficient transmission of light between corresponding fibers of mating connectors.

In an alternative connector body design (not shown), the molded part 66 is formed with features in the side walls 94 adjacent the rear face 74 for accepting a plastic insert to cover the ribbon cable and close off the cavity 82, thereby causing the resulting connector to look like a standard MT connector.

Accordingly, there has been disclosed an improved connector design and associated manufacturing method which provides increased manufacturing throughput. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

What is claimed is:

1. A method for making optical fiber connectors, wherein each of the connectors has a body with a rear face into which at least one optical fiber is received and a front mating face at which an end of said at least one optical fiber is exposed for light transfer with a corresponding optical fiber of a mating connector, the method comprising the steps of:

providing a mold having a mold cavity configured for forming as a unitary molded part a pair of connector bodies joined at their rear faces;

using said mold to produce said unitary molded part; and cutting said unitary molded part along a plane orthogonal to the length of said unitary molded part to separate said pair of connector bodies one from the other, wherein the planar cut forms the rear face of each of said pair of connector bodies.

2. The method according to claim 1 wherein the step of providing a mold includes the steps of:

providing at least two core pins; and inserting said core pins into said mold cavity orthogonal to said plane to subsequently provide at least one opening in each of said pair of connector bodies for receiving an optical fiber therein, wherein each of said at least one opening extends into its respective connector body from the front mating face thereof.

3. The method according to claim 2 wherein prior to the step of cutting the method further includes the step of:

removing said core pins from said unitary molded part.

4. The method according to claim 3 further including the step of:

installing from the rear face of each connector body an optical fiber in a respective one of said at least one opening with an end of the optical fiber extending outwardly beyond the front mating face.

5. The method according to claim 4 further including the step of:

polishing the front mating face of each connector body along with the outwardly extending end of an optical fiber.

6. An optical fiber connector having a rear face into which at least one optical fiber is received and a substantially parallel front mating face at which an end of said at least one optical fiber is exposed for light transfer with a corresponding optical fiber of a mating connector, the connector adapted to be molded as one of a pair of connectors joined at their rear faces and comprising:

a solid body terminated at opposed ends by said rear face and said front mating face and having an upper surface extending between said opposed ends;

a cavity extending into said body from said upper surface and said rear face, said cavity being bounded by a front wall parallel to said front mating face and being open along said upper surface from said rear face to said front wall; and at least one straight fiber receiving bore extending through said body from said front mating face to said cavity front wall and orthogonal to said front mating face;

whereby said at least one optical fiber can be installed transversely into said cavity and then manipulated longitudinally into said at least one fiber receiving bore.

7. The connector according to claim 6 wherein said cavity has a substantially planar lower wall orthogonal to said front wall and said at least one bore intersects said front wall at the juncture of said front wall and said lower wall.

8. The connector according to claim 7 wherein said lower wall is formed with at least one groove aligned with said at least one bore.

* * * * *